United States Patent
Teijeiro Castro et al.

(10) Patent No.: US 6,810,761 B2
(45) Date of Patent: Nov. 2, 2004

(54) MOTOR VEHICLE TRANSMISSION

(75) Inventors: Rafael Teijeiro Castro, Valladolid (ES); Jose Ramon Izquierdo Nuñez, Burgos (ES); Esteban Cañibano Alvarez, Villablino (ES); Juan Carlos Merino Senovilla, Valladolid (ES)

(73) Assignee: ZF Ansa Lemforder, S.L., Burgos (ES)

( * ) Notice: Subject to any disclaimer, the term of this patent is extended or adjusted under 35 U.S.C. 154(b) by 0 days.

(21) Appl. No.: 10/636,973

(22) Filed: Aug. 7, 2003

(65) Prior Publication Data

US 2004/0083842 A1 May 6, 2004

Related U.S. Application Data

(63) Continuation of application No. PCT/ES01/00046, filed on Feb. 12, 2001.

(51) Int. Cl.$^7$ .......................... B60K 20/00; F16C 1/00; G05G 9/00
(52) U.S. Cl. .................. 74/473.15; 74/473.1; 74/473.3; 74/473.33; 74/567
(58) Field of Search ........................... 74/473.1, 473.15, 74/473.3, 473.33, 567

(56) References Cited

U.S. PATENT DOCUMENTS

| | | | |
|---|---|---|---|
| 3,766,799 A | | 10/1973 | Desloovere |
| 3,808,907 A | | 5/1974 | Yamaguchi |
| 4,756,205 A | | 7/1988 | Dickinson |
| 4,779,477 A | * | 10/1988 | Horton ..................... 74/473.11 |
| 4,924,724 A | * | 5/1990 | Yoshimura ............... 74/473.15 |
| 5,378,179 A | * | 1/1995 | Riggle ......................... 440/62 |
| 5,560,253 A | | 10/1996 | Ishikawa et al. |
| 5,588,934 A | * | 12/1996 | Osborn et al. ................. 477/96 |
| 5,649,452 A | * | 7/1997 | Osborn et al. ............ 74/473.33 |

FOREIGN PATENT DOCUMENTS

ES         2 122 405 T3        12/1998

* cited by examiner

*Primary Examiner*—David A. Bucci
*Assistant Examiner*—Colby Hansen
(74) *Attorney, Agent, or Firm*—Katten Muchin, Zavis Rosenman

(57) ABSTRACT

The gear-change is comprised of a casing (1–2) for securing to the structure of the vehicle, and in said casing a cam (5) is located, to which twin lineal slide blocks (8) and (16) are linked, the first of these is linked to the gear-change selection cable (10) and the second to the gear selection cable (14); the slide block (8) having a side protrusion that freely moves in a slanting aperture (6) of the cam (5), so that the traverse movement of the lever (4) and corresponding tilting toward one side and another of the cam (5), brings with it the longitudinal movement of the slide block (8) and with that the traction or compression of the cable (10), whereas the forward and backward tilting movement of the lever (4), that is hinged on an axis (11) with respect to the cam (5), produces the longitudinal movement of the slide block (16) and with that the traction or compression of the cable (14).

4 Claims, 10 Drawing Sheets

MOTOR VEHICLE TRANSMISSION

This application is a continuation of PCT/ES01/00046, filed Feb. 12, 2001, still pending.

OBJECT OF THE INVENTION

This invention refers to a vehicle gear-change in which the lever transmission to the corresponding gear and gear-change selection cables is a lineal transmission movement thus allowing the force of the actual lever to be fully availed of.

The purpose of the invention is to a provide a gear-change for vehicles in which the movement of the selection cables is linearly executed, which allows a more compact mechanism to be obtained, a lighter lever and the use of plastic materials.

BACKGROUND OF THE INVENTION

Conventional gear-changes normally have a structure based on an activating lever that acts on two tensile-compression cables, in charge of carrying out the selection of the appropriate gear to be inserted for the speed required.

As is well known, when changing gears the lever is activated by two possible movements, one traverse and the other longitudinal, so that when the lever is transversally activated, it then acts on the gear-change selection cable, or in other words, on the transmission block to be used; whereas when the lever is activated in a longitudinal direction, it then acts on the gear-selection cable that determines which of the transmission block gears previously selected will be connected to the outgoing axle, and therefore the speed to be introduced.

Also, the fact is known that in gear-changes the activating lever finishes in a swivel joint that is located in a casing for securing it to the vehicle bodywork, a swivel joint that allows traverse and longitudinal movements of the lever previously alluded to.

Furthermore in conventional gear-changes, from the swivel joint referred to an arm projects downwards, and sometimes upwards, that at one end is attached to the gear-selection activating cable, so that forward or backward movement of the lever will cause the traction or compression of the cable and therefore connection with one of the gears of the corresponding transmission block.

Also of conventional use in the gear-changes is the arrangement that the swivel joint is linked to a traverse arm that acts on a articulated rod that, at its other end, is joined to gear-change selection cable, so that the traverse movement of the lever causes the articulated rod to tilt, which will then stretch or compress the activating cable that will select the corresponding transmission block.

The gear-change systems of the type referred to present the complication that the movement of the lever on the activating cables is circular in nature, and therefore the force applied onto the lever isn't completely transmitted in the direction of the cable, but rather it will divide into a tangential force (in the direction of the cable) and into a radial force (perpendicular to the cable), or, in other words, all of the force applied to the lever won't be fully transmitted.

Also, by using a swivel joint for the transmission of movement, the ends of the articulated rods, that act on the cables, follow circular paths, because of which the approach to the cable ends is not always made at the same angle, requiring pivot joints or parts that compensate for this effect and that logically complicate the mechanism; the movement kinematic chain being equally complicated on requiring the use of the articulated rod to allow traverse movement of the lever.

DESCRIPTION OF THE INVENTION

The vehicle gear-change that is proposed has been envisaged to fully resolve that difficulty, using a simple and efficient solution, based on a lineal movement concept, using for this purpose a lineal movement slide block or slide instead of the classic articulated rod of the kinematic chains used in conventional gear changes.

More specifically, the gear-change that is the subject of the invention includes a cam that is mounted inside a casing with respect to which it can tilt, said cam being linked to the corresponding activating lever, which is hinged between lugs extending towards the cam and linked at its lower end to a slide or lineal slide block to which the gear selection cable is linked, while another slide or slide block, also with the possibility of lineal movement, is linked to the gear change selection cable, this second slide block or slide having a protrusion or side protuberance that fits into a slanting aperture placed in the side wall of the cam, the slanting acting as a transmission contour so that in the traverse action of the lever the rotation or tilting of the lever towards one side or another of the cam takes place and with it the forward or backward movement of the aforementioned slide or slide block, to which the gear-selection cable is linked, producing its compression or traction.

The forwards or backwards movement of the activating lever will cause it to be tilted with respect to the cam connection lugs, in such a way that the lower end of the aforementioned lever will push the slide block, that is linked to the gear-selection cable, forwards or backwards, producing its compression or traction.

By means of this extremely simple solution a lineal movement transmission is obtained, with which full advantage is taken of the forces transmitted to the gear lever.

A simplification of the structure is also achieved, by disposing of the articulated rod of the conventional gear-changes, permitting a simpler assembly of selection cables, since the slide or slide blocks and the cables are aligned and their movements are always lengthways.

Therefore, a notably more compact mechanism than the conventional ones can be obtained, as well as it being possible to fabricate it completely from plastic, thus eliminating the metallic materials that are normally used in this type of mechanism, all of which will have repercussions in the vehicle since, on one hand, less space will be needed to install the mechanism, and on the other, the weight will be less, with the consequent advantages arising from this.

DESCRIPTION OF THE DRAWINGS

To supplement this description and with the aim of leading to a better understanding of the characteristics of the invention, in accordance with a preferred example of its practical embodiment, as an integral part of this description it is accompanied by a set of drawings where in an illustrative and non-limiting way, the following have been represented:

FIG. 8.—Shows a sequence of three section and back elevation figures, of three positions in the sideways movement of the lever.

FIG. 9.—Shows a sequence of three section and front elevation figures of three positions in the lengthways movement of the lever.

PREFERABLE EMBODIMENT OF THE INVENTION

Figure 1:
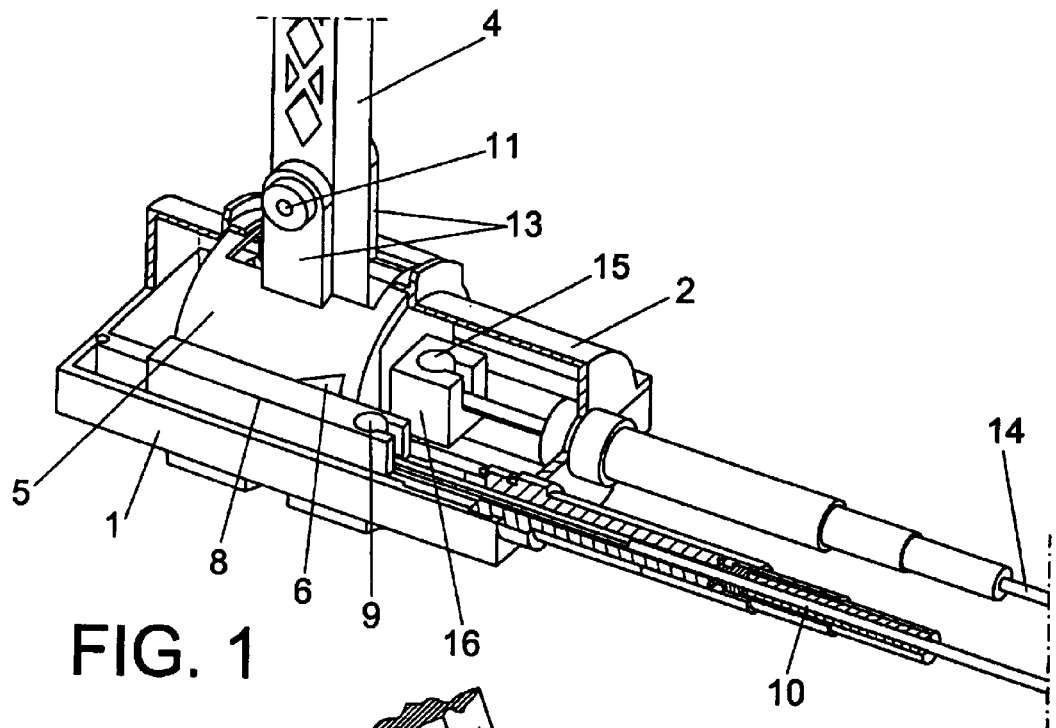
FIG. 1.—Shows a general perspective schematic representation of the vehicle gear-change carried out in agreement with the purpose of the invention, with the upper cowling of the body removed, to allow the different parts or components of the gear-change to be seen.
Figure 2:
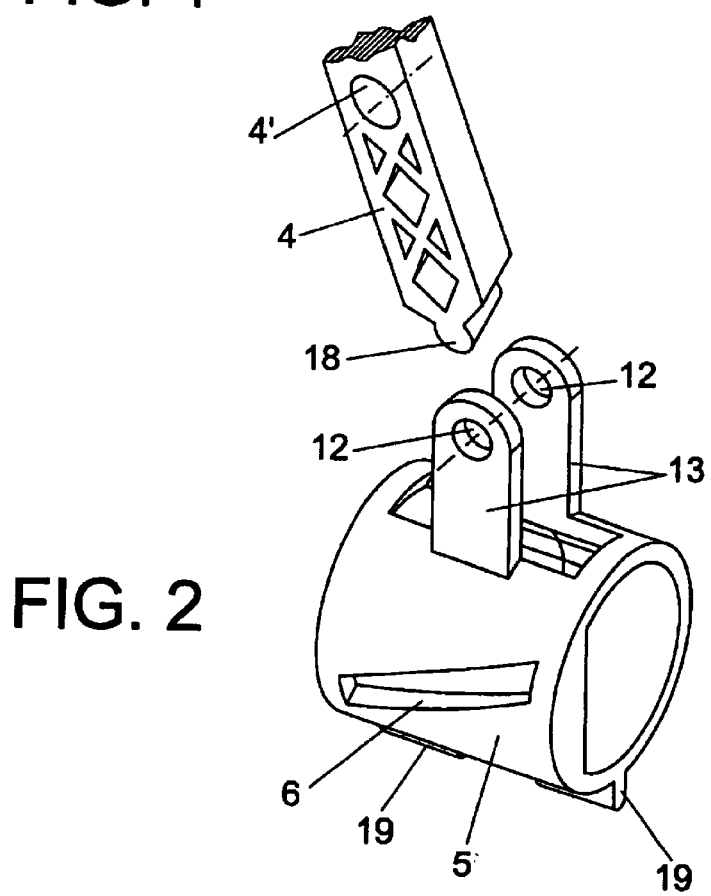
FIG. 2.—Shows a general perspective representation of the cam and the lower end of the activating lever, that form part of the gear-change assembly of the invention.
Figure 3:
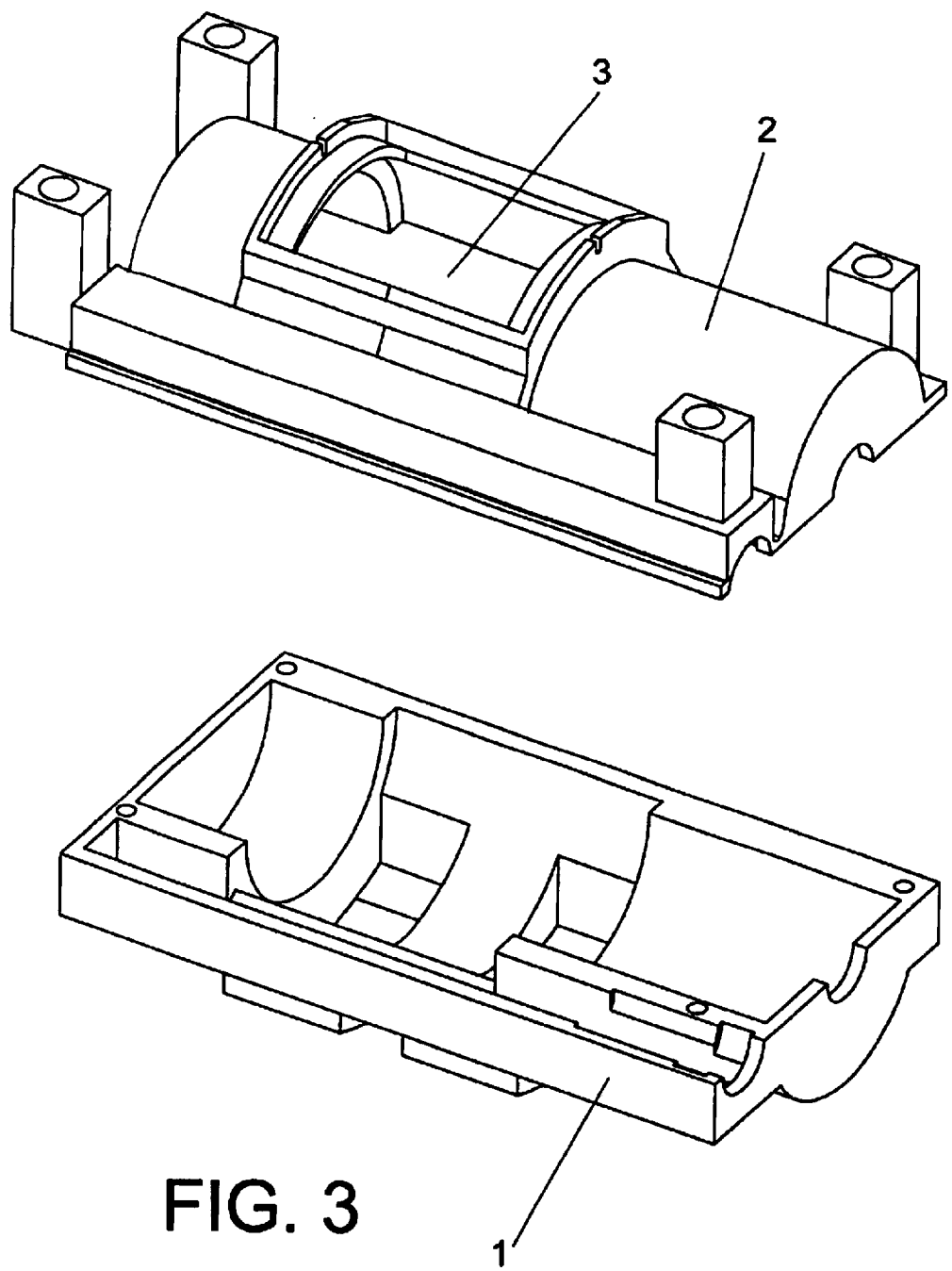
FIG. 3.—Shows a blow-up view of the two parts that comprise the mounting casing of the mechanism that forms the gear-change depicted in the previous figures.
Figure 4:
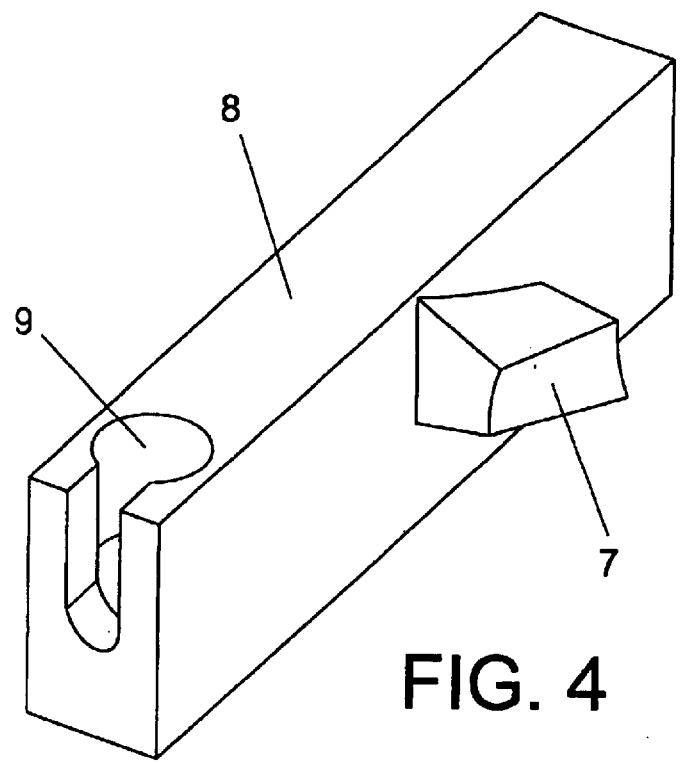
FIG. 4.—Shows a perspective view of the slide or slide block to which the gear-change selection cable will be joined.
Figure 5:
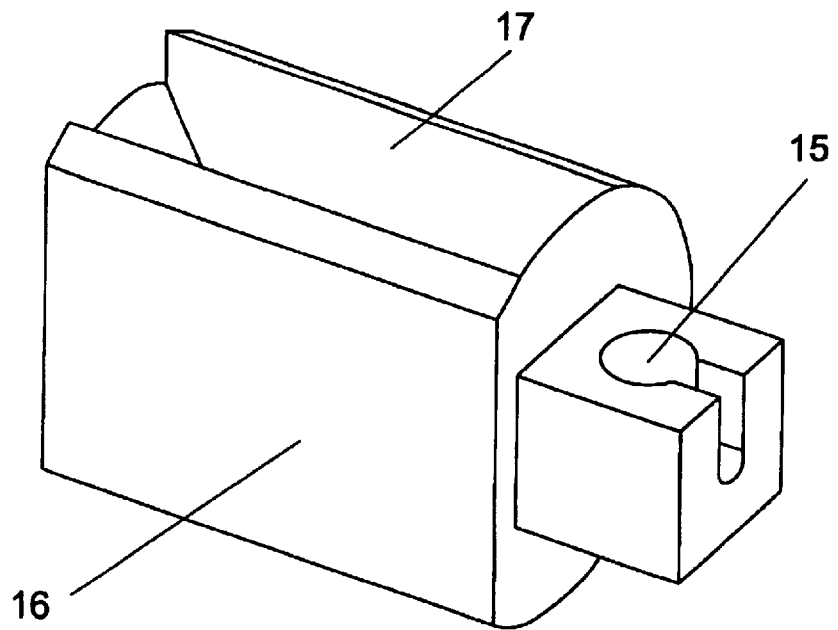
FIG. 5.—Shows the slide or slide block to which the gear-selection cable will be joined.
Figure 6:
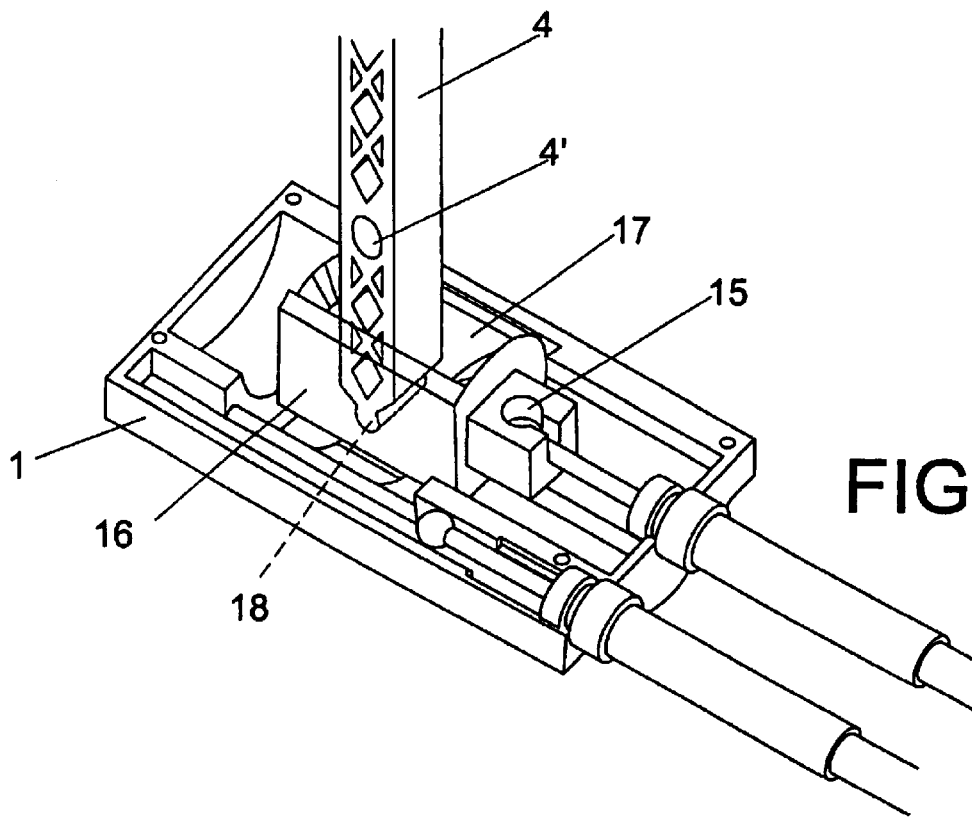
FIG. 6.—Shows a perspective view from above of the gear-change of the invention, from which the upper part of the casing, the housing, and the slide, have been eliminated.
Figure 7:
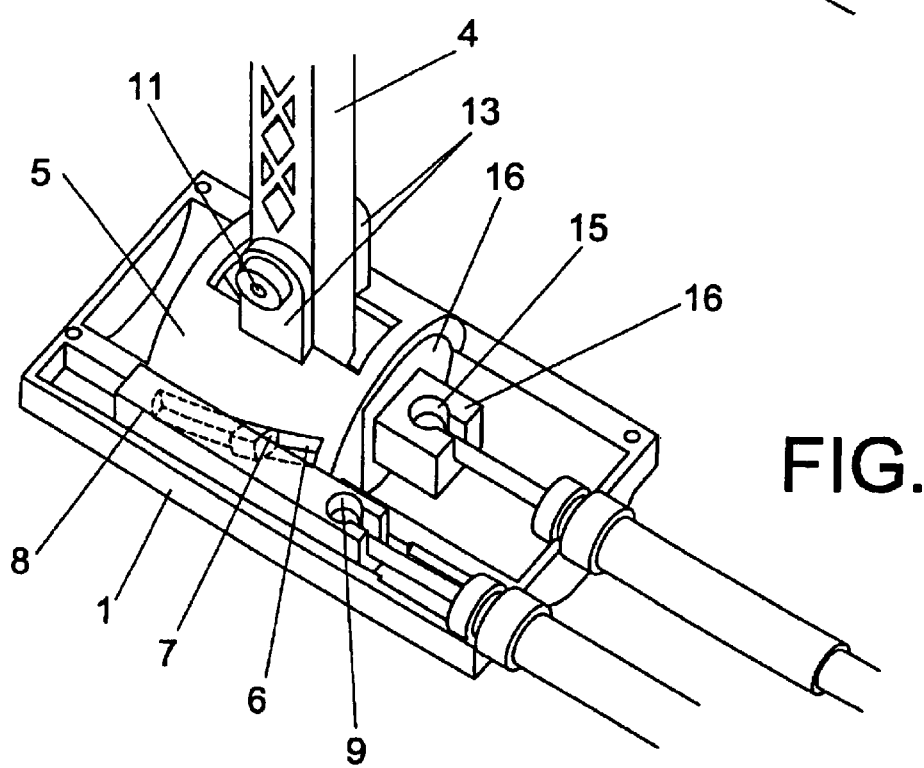
FIG. 7.—Shows a perspective view similar to the previous figure, in which the casing and the slide and with a broken line the side protrusion inside the slanting aperture, have been shown.
Figure 8A:
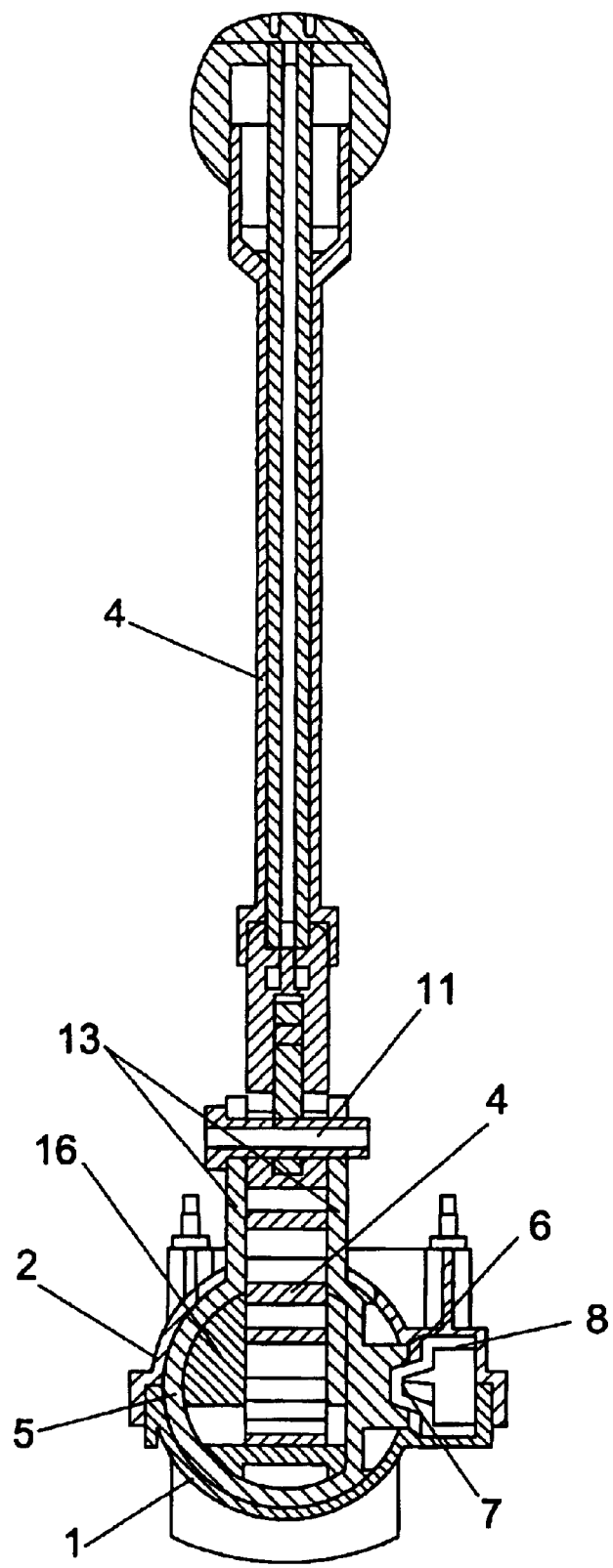
FIG. 8A shows a central position of the lever.
Figure 8B:
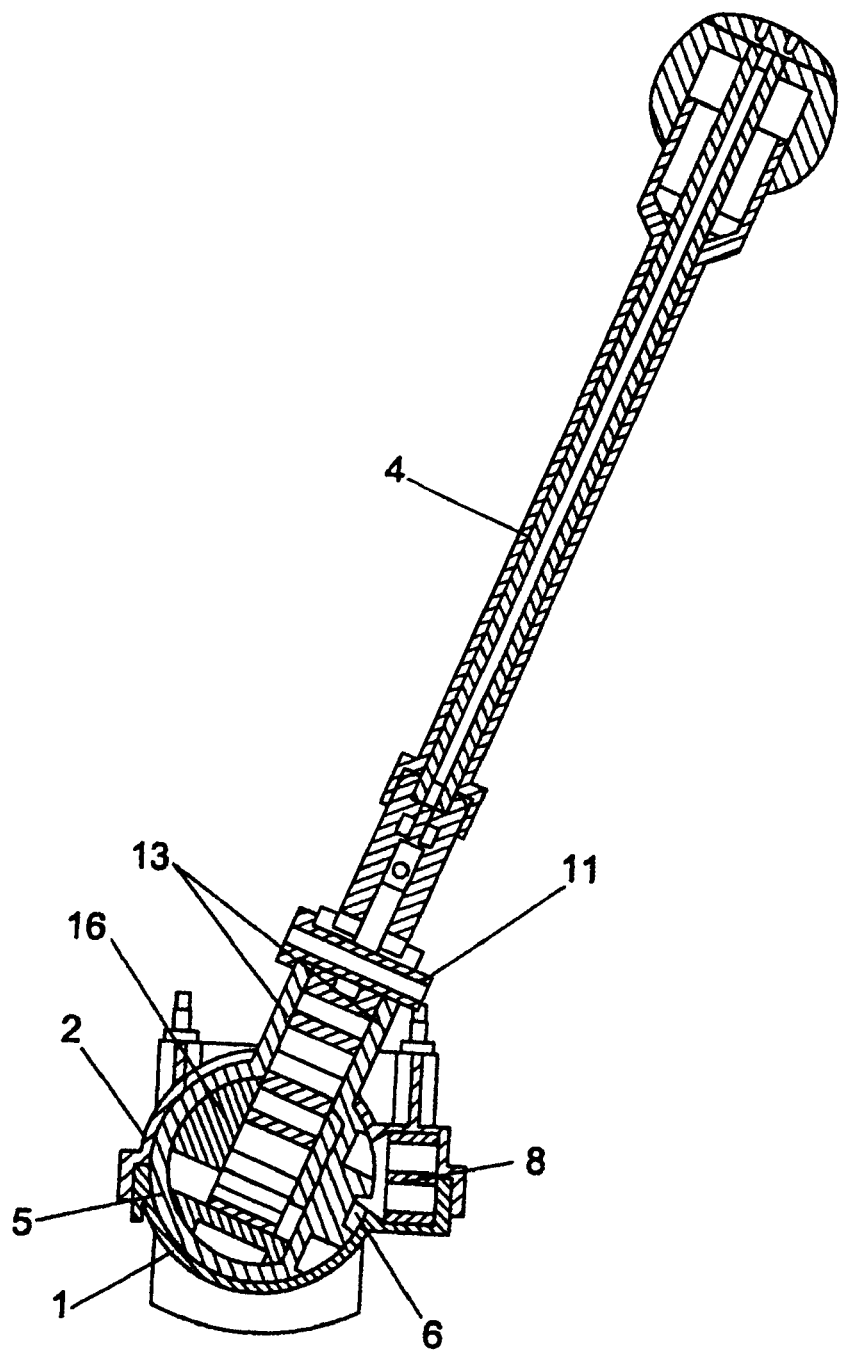
FIG. 8B shows the lever moved to the right of the assembly.
Figure 8C:
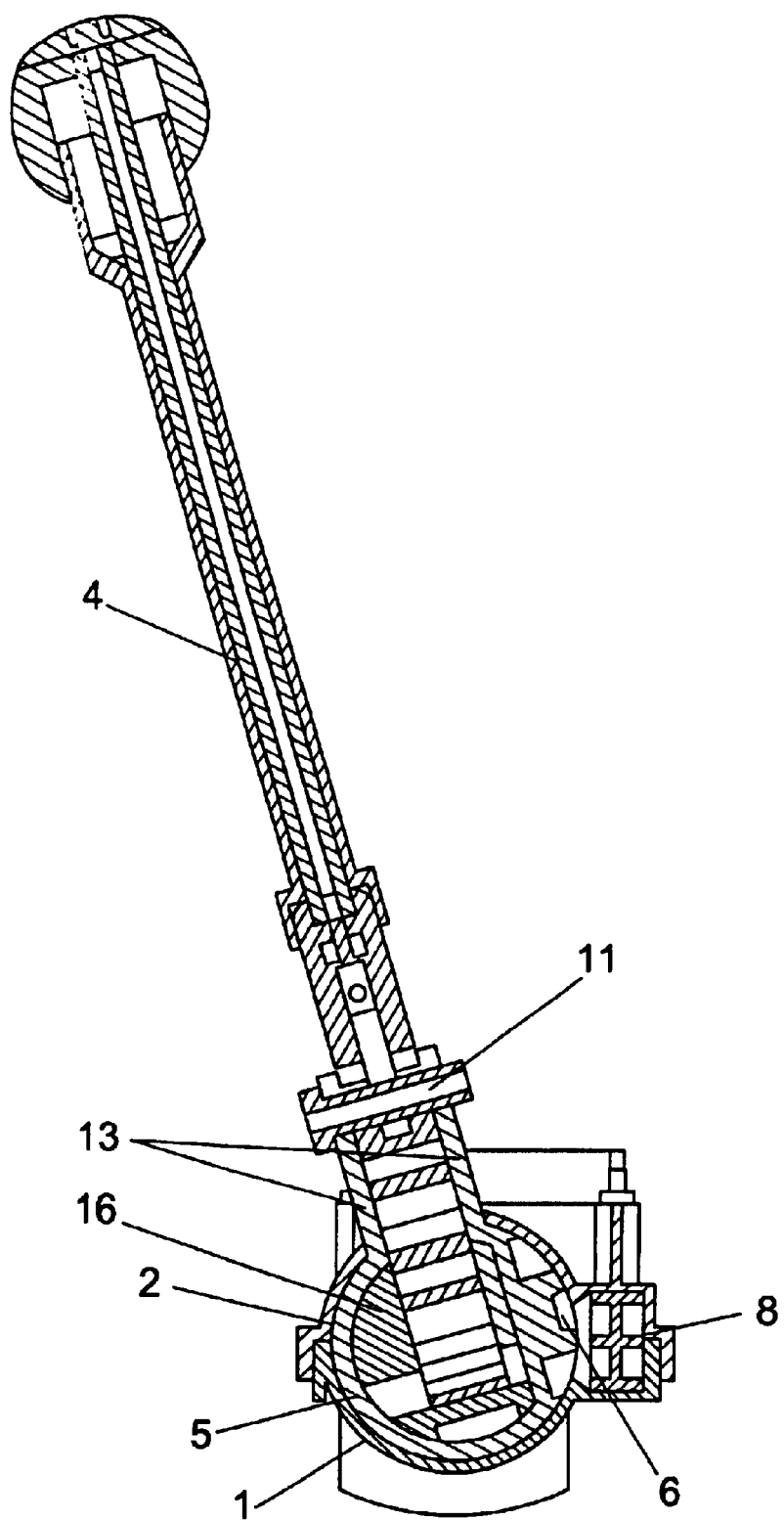
FIG. 8C shows the lever moved to the left.
Figure 9A:
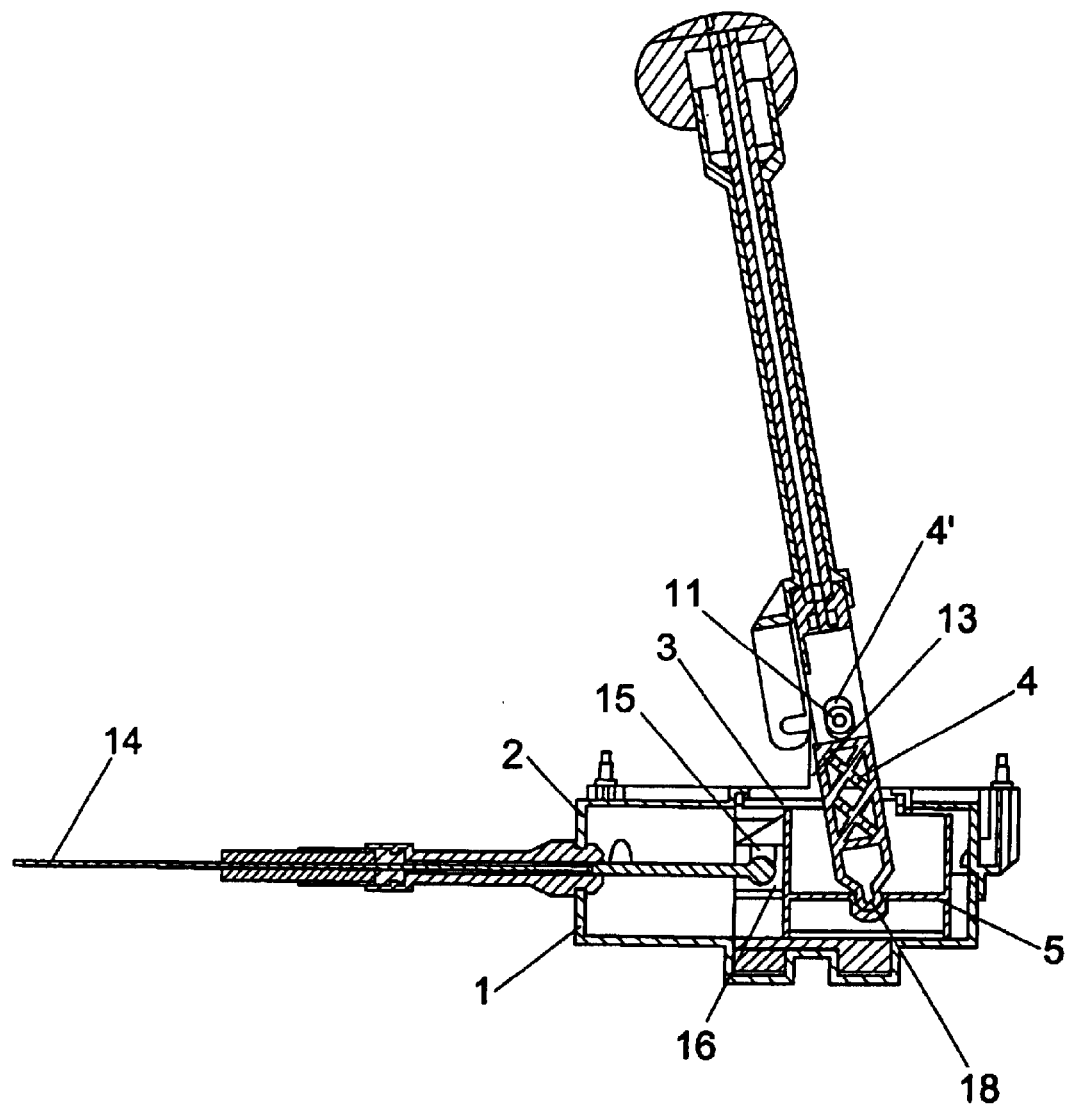
FIG. 9A shows the lever frontally positioned.
Figure 9B:
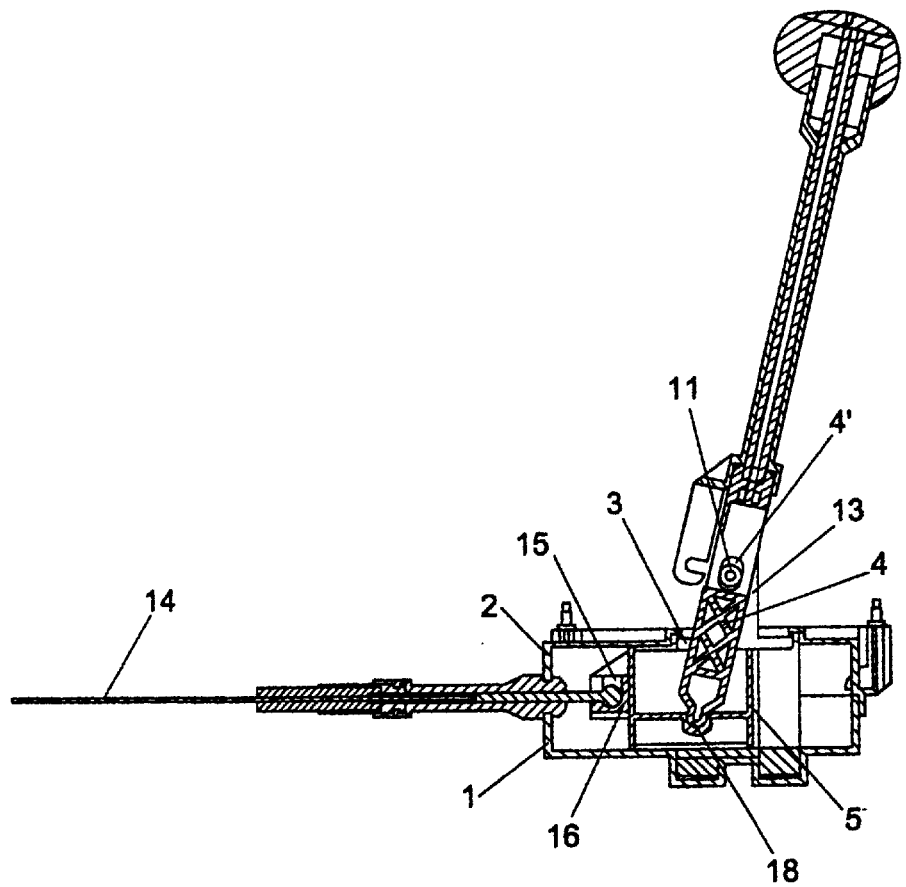
FIG. 9B shows the lever moved backwards.
Figure 9C:
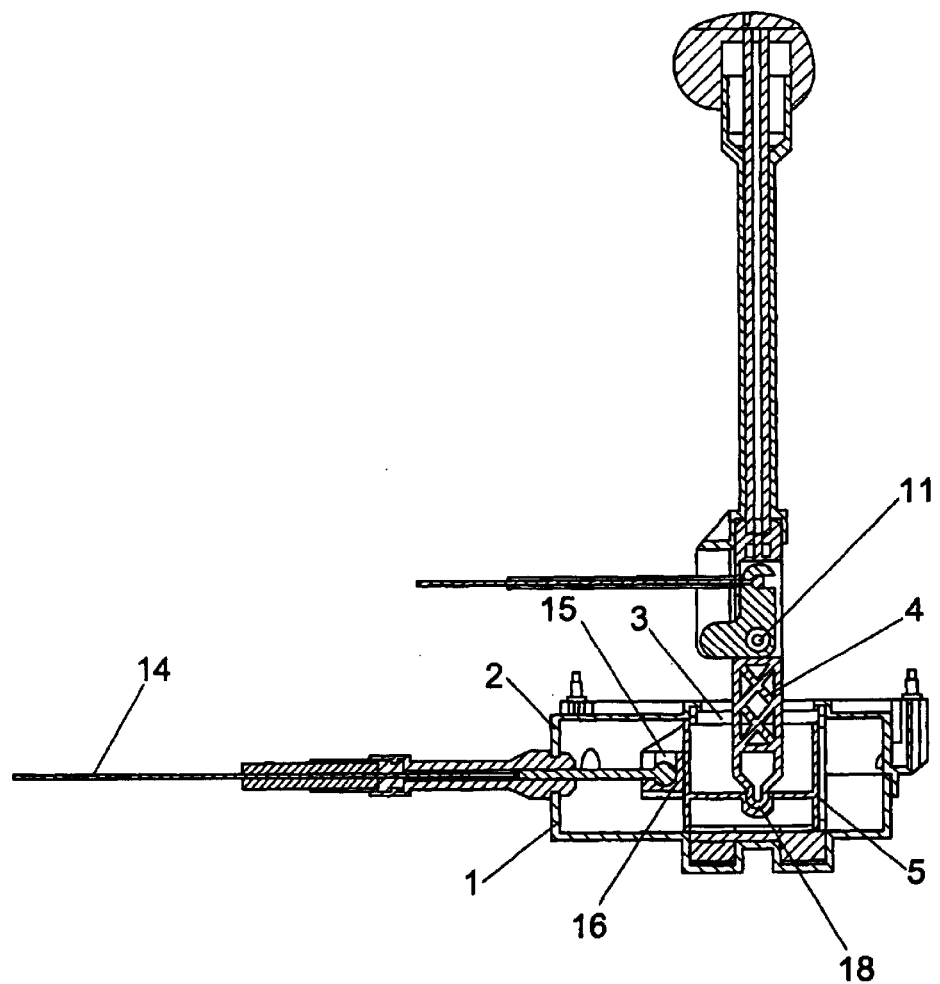
FIG. 9C shows the lever in a central position.

In the figures referred to, it can be seen how the vehicle gear-change that is subject of the invention includes a casing for securing it to the corresponding vehicle bodywork, a casing that has a lower part (1) that acts as a support and an upper part (2) that acts as an enclosing cover, this latter having a wide opening (3) through which the corresponding activating lever (4) is passed, whereas the lower casing has corresponding recesses and holders for the pieces that form the actual gear-change, as will be described herein.

In the lower part (1) of the casing a cam (5) capable of tilting to one side and another within that casing, is mounted, said cam (5) having a slanting aperture in its side surface (6), that acts as the cam contour, in which a protuberance (7), that is part of a slide piece or slide block (8) and that in one of its ends has a partially closed-off seating (9), for linking the end of the respective gear-change selection cable (10), freely moves.

The activating lever (4) is linked to the cam (5) through a transversally rotating axis (11), passed through the oppositely placed openings (12) of twin lugs (13) extending from the same cam (5), and between which the lower section of the lever (4) is positioned, so that the axis (11) is made pass through the opening (4') of that lever and through the openings (12) of the aforementioned lugs (13), the lever (4) thus remaining hinged with respect to the cam (5), allowing tilting corresponding to movement in a lengthways direction, whereas the activation in the traverse direction of that lever (4) causes tilting towards one side or another of the cam (5) and therefore forward or backward movement of the slide block or slide (8), with the side protrusion (7) of this latter positioned in the slanting aperture (6) of the aforementioned cam (5), thus producing the compression or traction of the gear change cable (10).

On the other hand, the gear selection cable (14) is secured in a partially cut off opening (15) that is part of a second slide or slide block (16) which has a cut-away (17) with inclined sides, in which cut-away (17) the lower end of the lever (4), specifically the extension (18), is housed.

In this way, when the lever moves in a lengthways direction, it will tilt about the pivot axis (11) and with this the forward or backward movement of the aforementioned slide or slide block (16) is produced, which causes the compression or traction of the gear-selection cable (14).

Finally noting that the cam (5) has projections (19) at the bottom, on which a spring continually acts, that constantly tends to bring the lever (4) to its rest position.

By means of this gear-change the transmission will be of lineal movement, benefiting fully from the effect that is transmitted by the activating lever (4), the structure having being simplified with respect to conventional gear-changes, since articulated rods for transmission of movement don't exist, furthermore allowing a simpler mounting of the selection cables (10) and (14), these being aligned with the slide or slide blocks (8) and (16), their movement always being lineal.

The gear-change concept referred to allows all of the parts to be made from plastic materials, it being possible to obtain an assembly with mechanisms of smaller size than the conventional ones, therefore less space is required in the vehicle for installing said mechanism, with the advantage that by being smaller, it will be possible to fabricate a lever of less weight, what will result in a reduction of the overall weight of the vehicle and therefore a lower fuel consumption.

What is claimed is:

1. Vehicle gear-change, that consists of a manual activating lever that is linked to the corresponding gear and gear-change selection cables, characterized in that it is constructed based on a cam (5) mounted inside a casing (1–2), with freedom to tilt laterally, a cam (5) that has in its side surface an oblique slot (6) in which there is a protrusion (7) rising laterally from a slide or slide block (8) to which the gear-change selection cable is linked, whereas the lower end (18) of the corresponding activating lever (4), passing through an opening in the upper part (2) of the casing, is housed in a cut-away (17) with inclined sides set out in a second slide block or slide (16) to which the gear-selection cable is linked (14), so that the traverse movement of the lever (4) brings about the tilting to one side and another of the cam (5) and with it the forward or backward movement of the slide block (8), to produce the compression or traction of the gear-change cable (10), in so much as the forward or backward tilting of said lever (4) produces the corresponding movement of the slide block (16) and with it the compression or traction of the gear-selection cable (14).

2. Vehicle gear-change, according to claim 1, characterised in that the lever (4) is mounted on an axis (11) about which it can tilt passing through the openings (12) of a pair of lugs rising from the cam (5) and through an opening (4') transversely set out in the actual lever (4).

3. Vehicle gear-change, according to claim 1, characterised in that the slide blocks (8) and (16) for linking the gear-change cables (10) and gear-selection cables (14), have in one of their respective ends partially cut off openings (9) and (15) in which the ends of said cables (10) and (14) are linked.

4. Vehicle gear-change, according to claim 1, characterised in that the cam (5) has projections (19) in its lower part on which a spring, that tends to maintain the corresponding lever (4) in rest position, acts.

* * * * *